United States Patent [19]

Sanderson

[11] Patent Number: 5,458,045
[45] Date of Patent: Oct. 17, 1995

[54] FEED CHUTE-TO-GUN AMMUNITION BELT GUIDE ADAPTER FOR MACHINE GUNS

[76] Inventor: Paul H. Sanderson, 2019 Cripple Creek, Lewisville, Tex. 75067

[21] Appl. No.: 218,229

[22] Filed: Mar. 25, 1994

[51] Int. Cl.[6] ........................................ F41A 9/30
[52] U.S. Cl. ........................... 89/33.16; 89/35.02
[58] Field of Search ..................... 89/33.16, 33.14, 89/33.2, 33.25, 35.02

[56] References Cited

U.S. PATENT DOCUMENTS

| 2,573,749 | 11/1951 | Wheeler et al. | 89/33.16 |
| 2,809,563 | 10/1957 | Hammer | 89/35.02 |
| 3,017,808 | 1/1962 | Uhl | 89/33.25 |

FOREIGN PATENT DOCUMENTS

| 566256 | 11/1958 | Canada | 89/33.25 |
| 355767 | 2/1930 | United Kingdom | 89/33.16 |
| 2000576 | 1/1979 | United Kingdom | 89/33.14 |

*Primary Examiner*—Stephen M. Johnson
*Attorney, Agent, or Firm*—Konneker & Bush

[57] ABSTRACT

Belted ammunition of either the "ball" or the shorter "SLAP" type is supplied through a flexible feed chute to a 7.62 mm mini machine gun using a specially configured feed adapter interconnected between the outlet end of the feed chute and the inlet of the gun feeder mechanism. The feed adapter, through which the ammunition passes into the gun feed mechanism, is provided with at least one internal roller around which the ammunition belt operatively passes. The roller has a side surface contour with a sloped shoulder portion which complementarily engages the sloping shoulders of the individual ammunition rounds passing around the roller. This complementary shoulder engagement longitudinally indexes the rounds within the adapter and limits undesirable longitudinal shifting of the rounds therein. In one embodiment thereof the adapter is connected to an aircraft plank-mounted mini gun and permits the ammunition belt to be routed over the gun, turned downwardly, and then bent sharply back into the gun's feeder mechanism without tending to cause ammunition jamming at the feed mechanism due to the sharp belt bend. In a second embodiment thereof the feed adapter is connected to a pintle-mounted mini gun and serves to provide improved vertical pivoting clearance between the gun and an aircraft door or window sill structure upon which the gun-supporting pintle apparatus is mounted. In a third embodiment thereof the feed adapter is connected to a pintle-mounted gun slidably mounted on a pivotable support arm member extending outwardly through an aircraft side door opening.

4 Claims, 5 Drawing Sheets

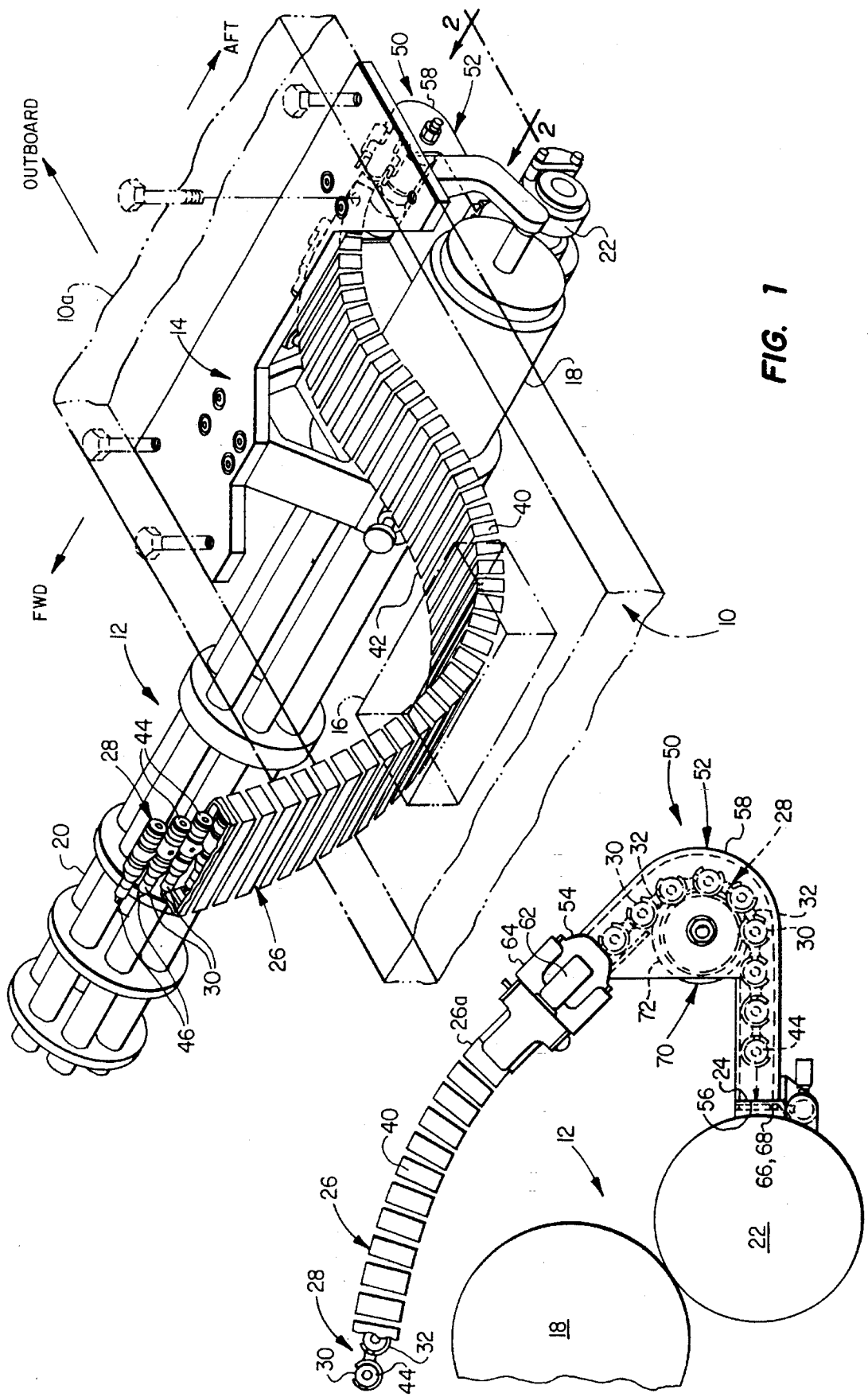

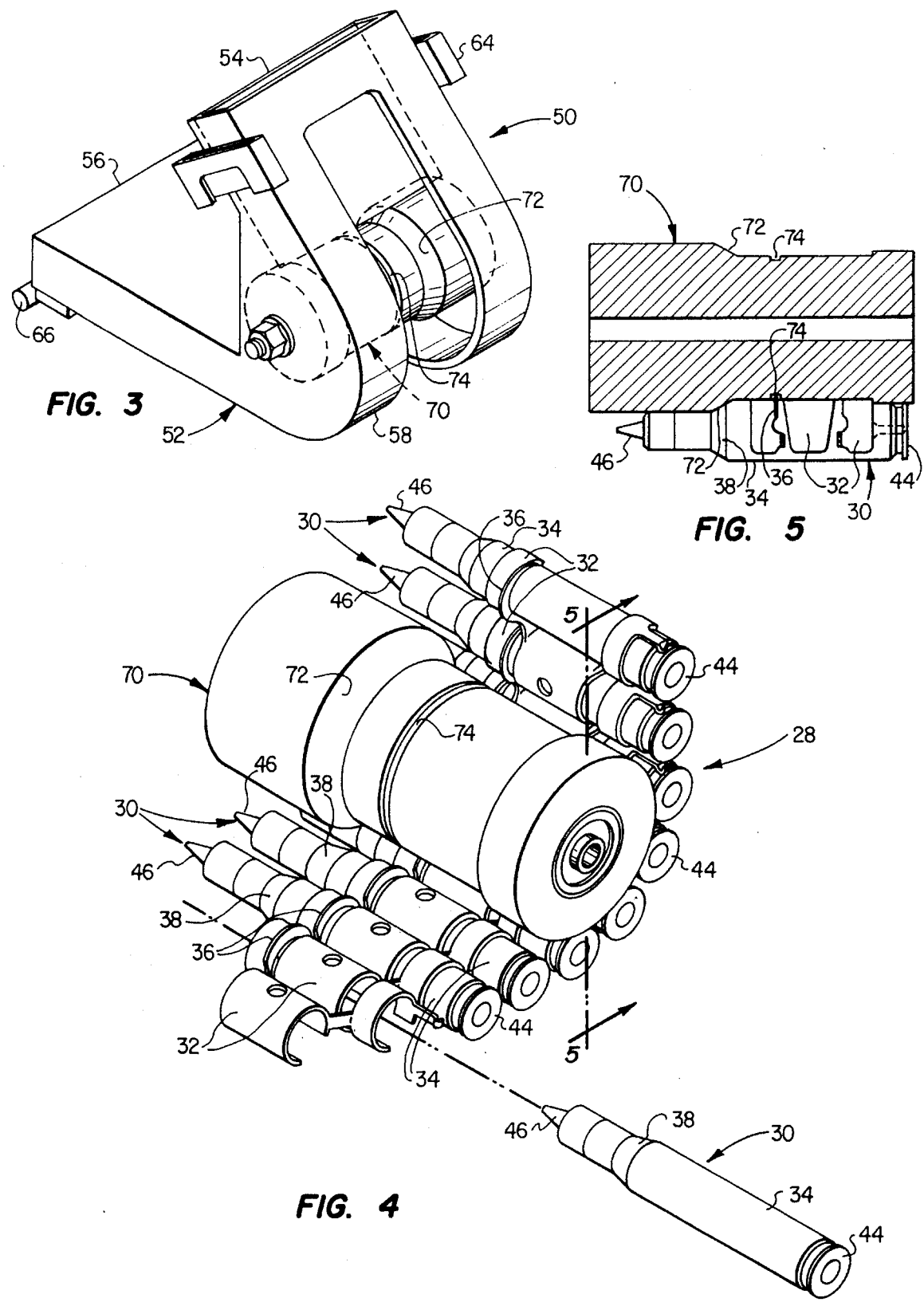

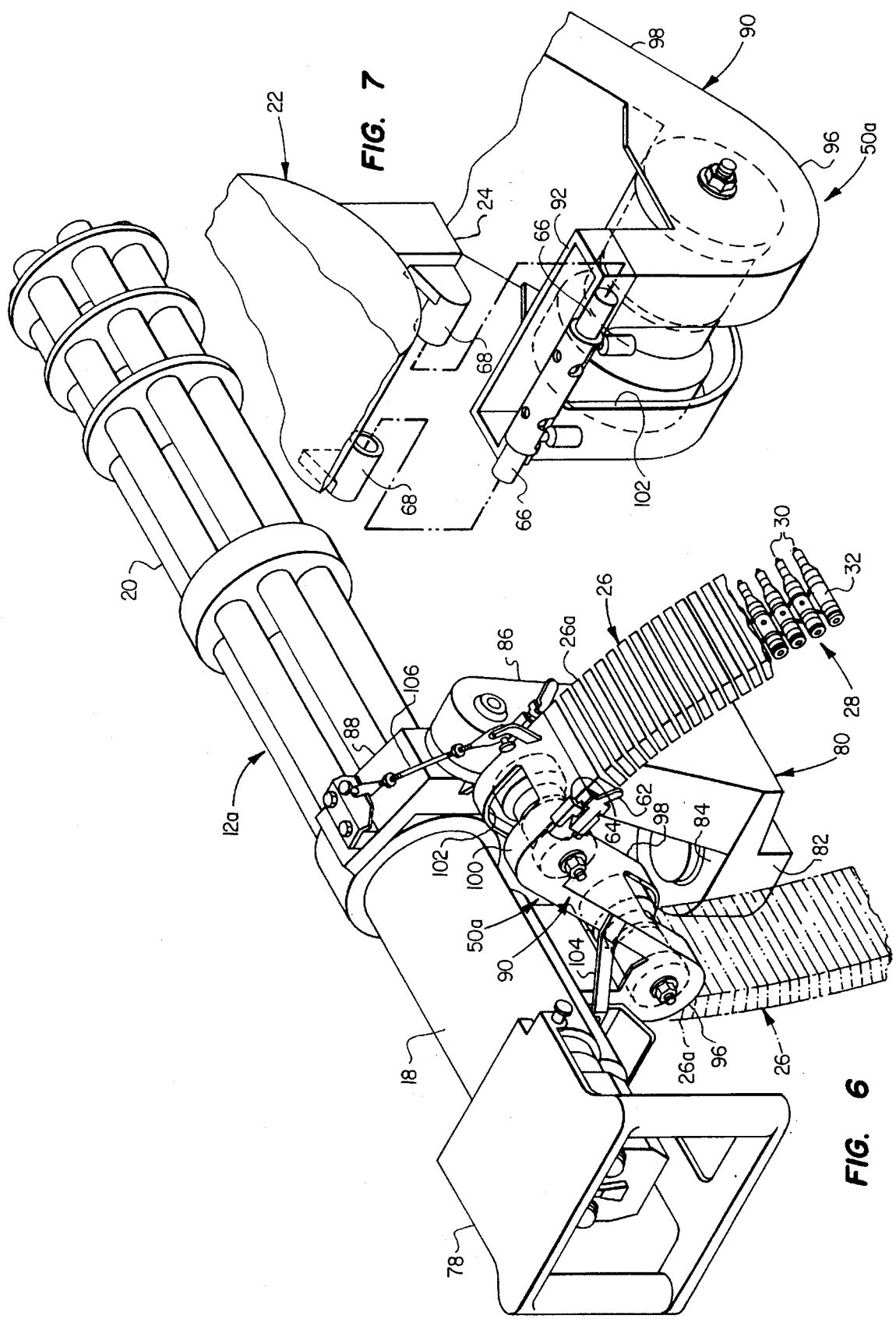

5,458,045

FEED CHUTE-TO-GUN AMMUNITION BELT GUIDE ADAPTER FOR MACHINE GUNS

BACKGROUND OF THE INVENTION

The present invention generally relates to armament apparatus and, in a preferred embodiment thereof, more particularly relates to the feeding of belted ammunition to 7.62 mm "mini" machine guns.

The 7.62 mm mini machine gun has been used in a variety of armament applications over the years and has proven to be a useful adjunct to larger rapid fire weaponry such as the .50 caliber machine gun. This type of machine gun may be operatively supported in a variety of manners for both crew served and remotely controlled firing in both ground and aircraft applications.

For example, in U.S. Pat. No. 5,187,318 to Sanderson et al a 7.62 mm mini gun is illustrated as being supported, in a fixed mount orientation for remote firing of the gun, on an outer end portion of an elongated support plank structure that transversely extends through the cabin area of a helicopter and longitudinally projects outwardly beyond the opposite sides of the helicopter body. A slot is formed through the outwardly projecting plank end portion that supports the mini gun, and belted ammunition is fed downwardly through the slot, to a feeder portion of the gun, from an ammunition magazine box supported within the aircraft cabin area.

As conventionally manufactured, a 7.62 mm mini machine gun has its ammunition feed structure (which receives the belted ammunition and feeds the individual rounds into the firing chamber of the gun) mounted on the right side of the gun (as viewed looking down the barrel of the gun from the rear end of the gun). This uniform placement of the gun feed structure causes an ammunition feeding problem in the support plank mini gun mounting method discussed above.

Specifically, when the gun is mounted on the outwardly projecting left end portion of the plank, the ammunition belt (and the feed chute through which it is routed) may be passed downwardly through the adjacent plank slot and then turned outwardly into the gun's ammunition feeder which, in this left plank end mounting of the gun, faces in an inboard direction. This routing of the ammunition belt permits it be bent through relatively smooth transition curves on its way to the gun feeder mechanism to thereby essentially avoid ammunition jamming problems at the gun feeder mechanism which could potentially caused by routing the ammunition belt through one or more sharp turns.

In this plank mounting application of the mini gun, however, these sharp ammunition belt turns, and the corresponding increased potential for ammunition jamming at the gun feeder, cannot presently be avoided when the gun is mounted on the right end portion of the support plank. This is due to the fact that in this gun placement on the plank the feed chute, and the ammunition belt therein, must be sequentially routed downwardly through the plank slot, over the top side of the gun, downwardly, and then in an inboard direction into the gun feeder mounted on the right side of the plank-mounted gun. This necessary succession of relatively sharp feed chute/ammunition belt bends undesirably tends to cause ammunition jamming at the gun feeder.

Such jamming tendency is particularly prevalent during either a gun start-up or an ammunition belt "drag" occurring at the ammunition magazine box. The jamming problem is created by an ammunition belt link breakage caused by either of these situations arising due to the sharp belt routing bends. As a result of this ammunition routing problem the plank mounting of 7.62 mm mini machine guns has, as a practical matter, been limited to the outwardly projecting left plank end (as viewed from the rear of the helicopter or other aircraft upon which the support plank is mounted).

In another aircraft mounting application thereof the mini gun is pintle-mounted on an elevated sill portion of an aircraft door or window structure and projects outwardly therethrough to be manually fired by a crew member standing within the aircraft cabin area behind the gun. The pintle structure upon which the gun is mounted is designed to permit the gun to be pivoted upwardly and downwardly, and from side to side, by the operator of the gun. The mini gun is supplied with belted ammunition from an ammunition magazine box disposed on the cabin area floor beneath and to one side of the gun. To facilitate belted ammunition feed to the pintle-mounted machine gun the gun is oriented on the pintle structure in a manner such that the side-mounted ammunition feeder on the gun faces downwardly.

When the ammunition magazine box is positioned leftwardly of the gun on the cabin floor the feed chute portion adjacent the gun may be bent horizontally away from the gun to a degree sufficient to permit the gun to be pivoted upwardly to its full upper limit position, if desired, without causing the feed chute to strike the sill structure and limit the upward pivotal movement of the gun and without causing ammunition jamming in the gun due to an overly sharp bend angle in the feed chute.

However, when the ammunition magazine box is disposed to the right of the gun the feed chute cannot be bent away from an interfering relationship with the pintle structure without sharply bending the feed chute portion adjacent the gun and thereby tending to create the aforementioned ammunition jamming. Accordingly, it is common practice to simply permit the feed chute to hang down inwardly over the sill structure on its way to the ammunition magazine box. This heretofore necessary practice in turn causes the feed chute to strike the pintle structure as the gun is pivoted upwardly toward its designed for upper limit position, thereby undesirably limiting the available upward pivotal movement of the gun.

It can be readily seen from the foregoing that it would be desirable to provide improved belted ammunition feed apparatus for 7.62 mm mini machine guns that eliminates or at least substantially reduces the above-mentioned machine gun ammunition feeding problems, limitations and disadvantages in the described gun mounting applications. It is accordingly an object of the present invention to provide such improved ammunition feed apparatus.

SUMMARY OF THE INVENTION

In carrying out principles of the present invention, in accordance with a first embodiment thereof, a specially designed feed adapter is provided for use in facilitating the longitudinal supply of an ammunition belt through a flexible feed chute to the feeder mechanism inlet on a 7.62 mm mini machine gun along a path having a relatively sharply curved portion adjacent the feeder inlet, the feed chute having an outlet end, and each round on the ammunition belt having a tapered annular shoulder portion.

The feed adapter includes a housing through which the ammunition belt may longitudinally pass. In one embodiment of the feed adapter, representatively used in conjunction with an aircraft support plank-mounted mini machine gun, the housing has a generally V-shaped configuration with an open inlet end connectable to the outlet end of the feed chute, an open outlet end connectable to the inlet of the gun feeder, and a first curved portion disposed between the inlet and outlet ends of the housing.

A roller member, around which the ammunition belt may operatively pass on its way to the feeder inlet through the housing, is supported within the curved housing portion for rotation relative thereto. The roller member has a tapered annular shoulder configured to complementarily engage the ammunition rounds in a manner inhibiting a lengthwise movement of the engaged rounds relative to the housing. The roller member thus serves to longitudinally index the rounds within the feed adapter housing, and facilitates the sharp bending of the ammunition belt adjacent the gun feeder, to thereby substantially diminish the potential for causing rounds to jam in the feeder due to the curved ammunition supply path.

The individual rounds in the ammunition belt are secured to one another by interlinked clip members having outwardly projecting portions longitudinally spaced apart from the tapered annular casing shoulders. According to another feature of the invention, the roller member has formed in its outer side surface an annular groove positioned and configured to receive and provide clearance for the outwardly projecting clip portions as the rounds pass around the roller member on their way to the gun feeder inlet through the feed adapter housing.

The feed adapter, via its specially contoured interior housing roller member, provides longitudinal indexing within the housing for both ball and "SLAP" type ammunition and permits the ammunition belt to be fed into the machine gun around a relatively sharply curved supply path adjacent the feeder portion of the gun.

In a second embodiment of the feed adapter of the present invention, representatively connected to a pintle-mounted mini machine gun supported on an elevated aircraft cabin window or door sill structure, the feed adapter housing has a generally S-shaped configuration with an outlet connected to the gun feeder, an inlet connectable to the outlet end of the feed chute, and a pair of oppositely curved portions spaced apart between the inlet and outlet ends of the housing. A specially contoured roller of the type described above is rotationally mounted in each of these two curved portions of the housing. This second embodiment of the feed adapter positions an outlet end of the feed chute relative to the gun in a manner such that the gun may be vertically pivoted to its full upper limit position without causing the feed chute to strike and be bent in a side edge-to-side edge fashion by the pintle structure, thereby potentially causing an ammunition jam in the gun feeder.

In a third embodiment of the feed adapter of the present invention, representatively connected to a pintle-mounted mini machine gun adjustably disposed on a pivoted support arm member extending outwardly through an aircraft window opening, the feed adapter housing has a generally L-shaped configuration with an outlet connected to the gun feeder, an inlet connectable to the outlet end of the feed chute, and a curved portion positioned between the feed adapter inlet and outlet and having a specially contoured roller of the type described above rotationally mounted therein. This embodiment of the feed adapter helps to prevent undesirable interference between the feed chute and the support arm member, and also facilitates the routing of the ammunition belt past a link ejector chute attached to the gun feeder.

BRIEF DESCRIPTION OF THE DRAWINGS

FIG. 1 is a partially phantomed perspective view of a 7.62 mm mini machine gun mounted on the underside of a right end portion of a support plank projecting outwardly beyond a cabin side of an aircraft (not illustrated) and being supplied with belted ammunition using a specially designed feed adapter embodying principles of the present invention;

FIG. 2 is an enlarged scale simplified partial rear end elevational view of the gun taken along line 2—2 of FIG. 1;

FIG. 3 is an enlarged scale perspective view of the feed adapter removed from the gun;

FIG. 4 is a partially exploded perspective view of a uniquely configured interior roller portion of the feed adapter and a portion of an ammunition belt operatively routed around the roller;

FIG. 5 is a cross-sectional view through the roller taken along line 5—5 of FIG. 4;

FIG. 6 is a perspective view of a pintle-mounted 7.62 mm machine gun being supplied with belted ammunition using a second embodiment of the feed adapter;

FIG. 7 is an enlarged scale exploded perspective view of an outlet end portion of the FIG. 6 feed adapter removed from the feeder portion of its associated gun;

DETAILED DESCRIPTION

Figure 8:
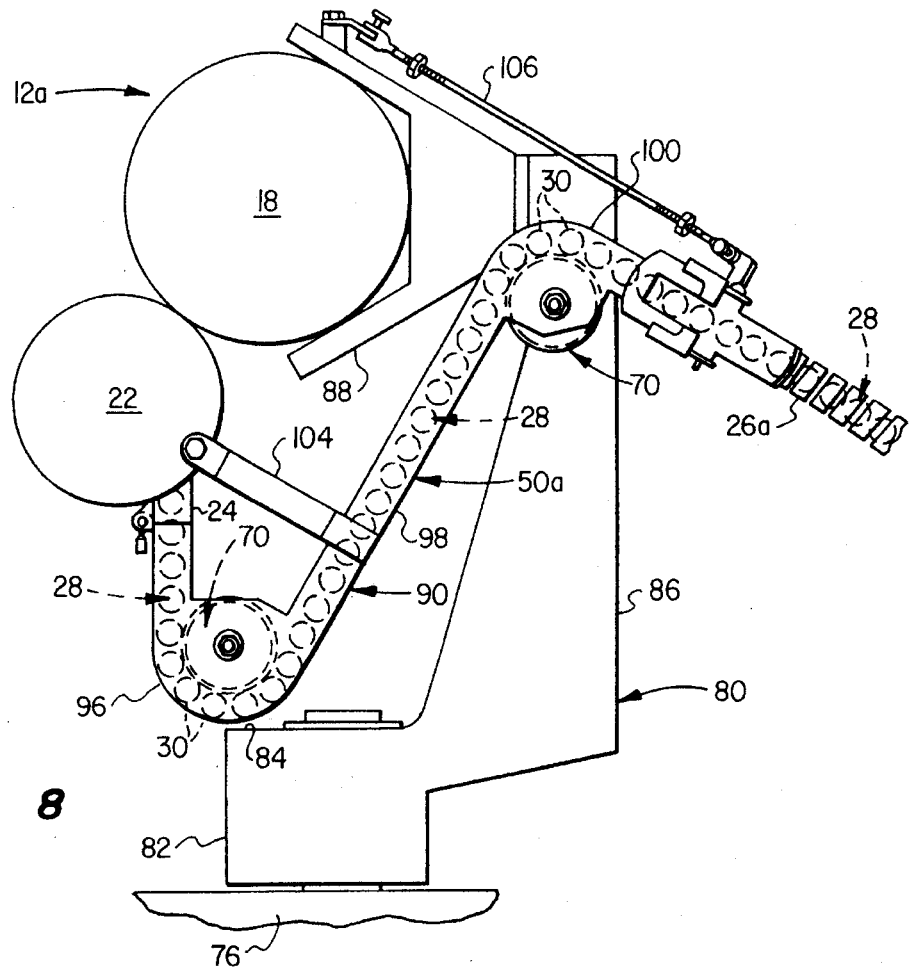
FIG. 8 is a simplified rear end elevational view of the FIG. 6 gun and the second feed adapter embodiment connected thereto.
Figure 9:
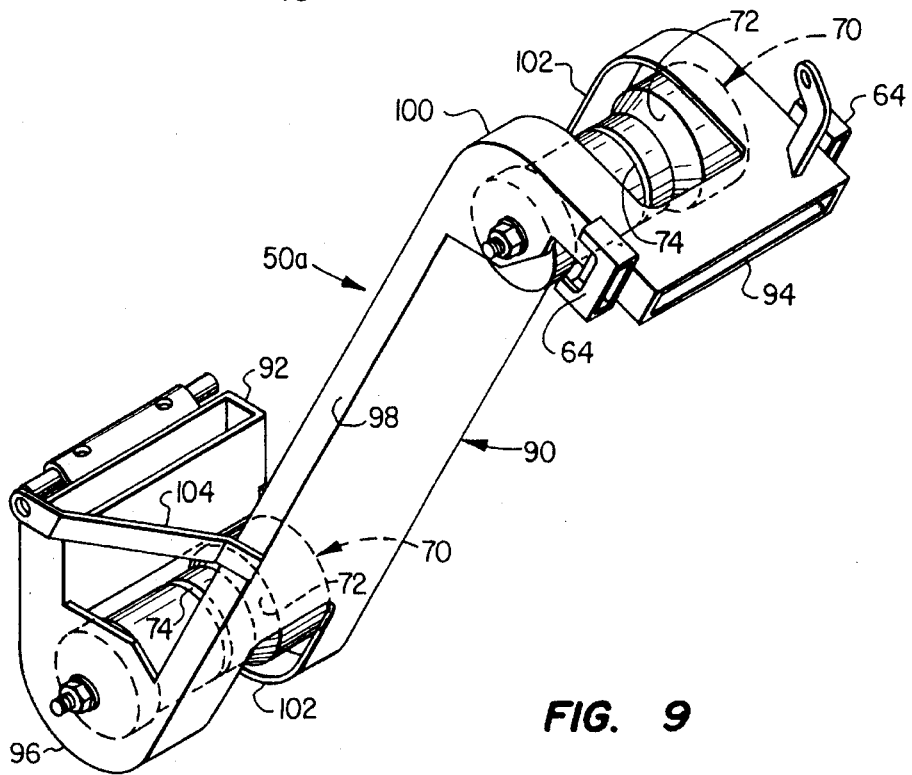
FIG. 9 is an enlarged scale perspective view of the second feed adapter embodiment removed from its associated gun.

Perspectively illustrated in FIG. 1 is an outer end portion 10a of an elongated armament support plank member 10 similar to that illustrated and described in U.S. Pat. No. 5,187,318 to Sanderson et al, the disclosure of such patent having been incorporated herein by reference. Plank end portion 10a projects outwardly beyond the right cabin side portion of an aircraft (not shown), such as a helicopter, as viewed from the rear of the aircraft. A conventional 7.62 mm mini machine gun 12 is supported on the underside of the outwardly projecting right plank end portion 10a, in a downwardly spaced relationship therewith, by means of a mounting structure 14 similar to that illustrated and described in U.S. Pat. No. 5,187,318. The mounted machine gun 12 is positioned outboard of a rectangular ammunition feed slot 16 formed through the plank portion 10a.

Referring now to FIGS. 1 and 2, the machine gun 12 has a body portion 18 secured to the mounting structure 14, and a barrel portion 20 extending forwardly from the body portion 18. Operatively mounted on a right underside portion of the gun body 18 is a conventional gun feeder mechanism 22 which functions to feed belted ammunition to the gun. Feeder mechanism 22 has a horizontally outwardly facing inlet 24 for receiving the ammunition as later described herein.

Extending from the cabin area of the aircraft to adjacent the gun feeder inlet 24 is a flexible feed chute 26 that passes downwardly through the plank slot 16, extends outwardly across the top side of the gun body 18, and then bends downwardly past the outer side of the gun body 18. As can be best be seen in FIG. 2, the feed chute 26 has an open outlet end portion 26a. A 7.62 mm ammunition belt 28 longitudinally passes through the feed chute 26 and has an outer end operatively received in the feeder inlet 24 for longitudinal infeed into the gun by the gun feeder mechanism 22 during firing of the machine gun 12.

As best illustrated in FIG. 4, the ammunition belt 28 is representatively formed from a side-by-side series of 7.62 mm "SLAP" type ammunition rounds 30 which, in a conventional manner, are releasably secured to one another by a series of laterally overlapped clip members 32 which are progressively stripped away and ejected by the feeder mechanism 22 as it feeds the individual rounds 30 into the firing chamber of the machine gun 12. The clip members 32, as depicted, have partially circular body portions that partly circumscribe the casing portions 34 of the rounds 30, and also have laterally outwardly projecting tab portions 36 (see FIG. 5 also).

At their forward ends the round casings 34 have annular tapered shoulder portions 38. As may best be seen in FIG. 1, the flexible feed chute 26 has opposite side edge portions 40 and 42, with the rear ends 44 of the rounds 30 being closely adjacent the feed chute side edge 40 and the front end projectile tips 46 of the rounds 30 being inwardly offset from the opposite feed chute side edge 42. As previously mentioned, the representative 7.62 mm ammunition belt 28 is made up from SLAP rounds 30 ("sabot light armor penetrating"). However, it could also be made up from the somewhat longer "ball" type 7.62 mm rounds, in which case the projectile tips of the rounds would be closely adjacent the feed chute side edge 42 so that there would be only minimal side edge-to-side edge play of the rounds within the feed chute.

Referring now to FIGS. 1–5, it can be seen that the feed path of the ammunition belt 28, of necessity, must be passed through a relatively sharp bend adjacent the feeder inlet 24 (see FIG. 2) to enter the gun feeder 22 when the machine gun 12 is mounted on the outwardly projecting right end portion 10a of the support plank 10 as opposed to being mounted on the outwardly projecting left end portion of the plank as shown in the aforementioned U.S. Pat. No. 5,187,318, in which case a relatively smooth ammunition belt transition bend at the gun feeder may be used. This sharp bend of the ammunition belt when the machine gun 12 is mounted on the outwardly projecting right end portion 10a of the support plank 10 has heretofore resulted in a tendency of the ammunition rounds 30 to jam in the gun feeder 22. Accordingly, as a practical matter, it has previously not been desirable to mount a 7.62 mm mini machine gun on the right plank end portion.

In the present invention this potential jamming problem has been essentially eliminated by the use of a specially designed feed adapter 50 which is illustrated in FIGS. 1–3 and is operatively and removably interposed between the outlet end 26a of the feed chute 26 and the inlet 24 of the gun feeder mechanism 22. The feed adapter 50 includes a generally V-shaped metal housing 52 having an open inlet end 54, a curved portion 58 positioned between the ends 54 and 56, and an outer side wall slot 60 extending from adjacent the inlet end 54 and the outlet end 56 of the housing 52. Conventional clip and tab structures 62,64 are used to removably connect the inlet end 54 of the housing 52 to the outlet end of the feed chute 26, and conventional pin and slot structures 66,68 are used to removably connect the outlet end 56 of the housing 52 to the gun feeder inlet 24.

As shown in FIGS. 2–5, a specially configured roller member 70 is rotationally mounted in the curved intermediate portion 58 of the feed adapter housing 52, and the ammunition belt 28 longitudinally extends through the housing 52 and is operatively passed around and engages an outer side surface of the roller member 70 on its way to the gun feeder mechanism 22.

Roller 70 has formed on its outer side surface a tapered annular shoulder portion 72 and an annular groove 74 spaced longitudinally apart from the shoulder 72. As best illustrated in FIG. 5, the roller shoulder 72 is configured, and positioned within the feed adapter housing 52 to complementarily engage the round casing shoulders 38 as the rounds pass around the outer side of the roller as they are being supplied to the gun feeder mechanism 22. This complementary abutting engagement between the shoulders 38,72 serves to longitudinally index the ammunition rounds 30 within the feed adapter housing 52 in a manner inhibiting a leftward shifting of the rounds 30 (as viewed in FIG. 5) within the feed adapter housing 52 which might tend to cause ammunition jamming within the gun feeder 22. As also illustrated in FIG. 5, the annular roller groove 74 is positioned to receive and provide clearance space for the clip tab portions 38.

The ammunition round indexing function uniquely provided by the feed adapter roller member 70 is particularly useful when, as representatively illustrated, SLAP rounds 30 are used to form the ammunition belt 28 since these rounds are substantially shorter than the side edge-to-side edge widths of the feed chute 26 and the feed adapter housing 52. However, this same complementary round shoulder-to-roller shoulder abutting engagement is present when the longer "ball" type 7.62 mm ammunition rounds are used to form the ammunition belt. Accordingly, the feed adapter 50 may be used in conjunction with either of these two types of 7.62 mm machine gun ammunition.

It can readily be seen that the specially configured feed adapter 50 of the present invention advantageously permits the illustrated 7.62 mm mini machine gun 12 to be mounted on the outwardly projecting right plank end portion 10a, with the roller member permitting the necessary sharp belt bend adjacent the gun feeder mechanism 22 and also providing the longitudinal round indexing that permits the use of either SLAP or ball type ammunition in this application of the gun.

Turning now to FIGS. 6–9, the present invention also provides a second embodiment 50a of the previously described feed adapter 50 which is utilized to uniquely solve an ammunition feeding problem associated with a crew served 7.62 mm mini machine gun 12a mounted on an elevated support structure, representatively an elevated sill structure 76 (see FIG. 8) in an aircraft cabin area door or window. Machine gun 12a is substantially identical to the previously described gun 12 with the exception that a handle/trigger structure 78 is operatively secured to the rear end of the gun body portion 18.

A conventional pintle structure 80 is used to support the machine gun 12a on the elevated sill 76 with the barrel portion 20 of the gun extending outwardly through the cabin door or window opening above the sill. Pintle structure 80 has a base portion 82 having a top side 84, a vertical portion 86 horizontally offset from and projecting upwardly beyond the base portion 82, and a support yoke portion 88 projecting transversely outwardly from the upper end of the vertical pintle portion 86, generally above the base portion 82.

As shown in FIGS. 6 and 8, the gun body 18 is supported within the pintle yoke 88. In a conventional manner the yoke 88 is connected to the upper end of the vertical portion 86 for pivotal movement relative thereto about a horizontal axis to permit the gun 12a to be manually pivoted between predetermined upper and lower elevational limit positions. In a similar conventional manner the pintle base portion is secured to the sill 76 for pivotal motion relative thereto about a vertical axis to permit the gun 12a to be selectively swung from side to side by the operator of the gun using the handle/trigger structure 78. Also in a conventional manner the gun body 18 is oriented in the pintle yoke portion 88 in a manner such that, as viewed from the rear of the gun the feeder 22 is on a lower left side portion of the gun 12a with the feeder inlet 24 facing downwardly.

The conventional method of supplying 7.62 mm belted ammunition to the pintle-mounted machine gun 12a, as depicted in phantom in FIG. 6, is to position an ammunition magazine box (not shown) on the cabin floor to one side of the gun, extend the flexible feed chute 26 from the magazine box to the gun, and connect the outlet end 26a of the feed chute (through which the ammunition belt 28 longitudinally extends) directly to the gun feeder inlet 24. When the ammunition box is positioned to the left of the gun 12a (as viewed from the rear of the gun), the feed chute 26 clears the pintle base 82 when the gun is vertically pivoted to its designed for upper limit position.

However, when the magazine box is positioned rightwardly of the gun an outlet end portion of the feed chute 26 is positioned directly behind the pintle base portion as indicated in phantom in FIG. 6. Accordingly, as the gun 12a pivotally approaches its upper limit position, the feed chute strikes the pintle base portion 82 and prevents the gun from being pivoted to its full upper limit position. As will now be described, the feed adapter 50a of the present invention uniquely eliminates this well known feed chute interference problem.

Feed adapter 50a includes a generally S-shaped housing 90, through which the ammunition belt 28 is longitudinally extendable, which is operatively interconnectable between the outlet end 26a of the feed chute 26 and the inlet 24 of the gun feeder 22. Housing 90 has an open outlet end 92; an open inlet end 94; an upwardly curved portion 96 adjacent outlet end 92; a central body portion 98 extending upwardly and rightwardly from the curved portion 96; a downwardly curved portion 100 positioned between the upper end of the central body portion 98 and the inlet end 94; and an outer side slot 102. A pair of the previously described indexing roller members 70 are rotationally mounted within the curved housing portions 96 and 100, each of the roller members having the sloped annular shoulder 72 and the annular groove 74 as described above in conjunction with the feed adapter 50.

Using the illustrated conventional clip and tab structures 62 and 64 the inlet end 94 of the housing 90 is removably connected to the outlet end 26a of the feed chute 26 as shown in solid line form in FIG. 6, and using the illustrated conventional pin and shoulder structures 66,68 shown in FIG. 7 the outlet end 92 of the housing 90 is removably connected to the gun feeder inlet 24. To provide additional support for the housing 90, a suitable support member 104 is interconnected between the curved housing portion 96 and the gun feeder mechanism 22, and a suitable support member 106 is interconnected between the curved housing portion 100 and the pintle yoke 88.

As may be seen by comparing the solid line and phantomed positions of the feed chute 26 in FIG. 6, the use of the feed adapter 50a positions an outlet end portion of the feed chute 26 rightwardly of the pintle structure. Additionally, as best illustrated in FIG. 8, the lower curved portion 96 of the feed adapter housing 90 (and thus the portion of the ammunition belt 28 within the curved housing portion 96) is positioned slightly upwardly of the top side 84 of the pintle base portion 82.

This repositioning of the feed chute 26, and the ammunition belt 28 longitudinally extending therethrough, when the magazine box is disposed to the right of the machine gun 12a eliminates the previous interference between the feed chute 26 and the pintle base 82 as the gun 12a pivotally approaches its upper limit position. Accordingly, the gun may now be upwardly pivoted clear to its intended upper limit position without potentially creating ammunition jamming within the gun.

The two contoured roller members 70 incorporated in the feed adapter 50a function in exactly the same manner as the single roller member 70 incorporated in the previously described feed adapter 50 to longitudinally index the SLAP rounds 30 in the feed adapter 50a, and to facilitate the two relatively sharp ammunition belt bends adjacent the feeder mechanism 22 of the gun 12a. Specifically, the shoulders 72 of these two rollers form complementary indexing abutments for the casing shoulders 38 of the rounds 30 passing around the rollers, and the roller grooves 72 receive and provide clearance space for the clip tabs 36.

Figure 10:
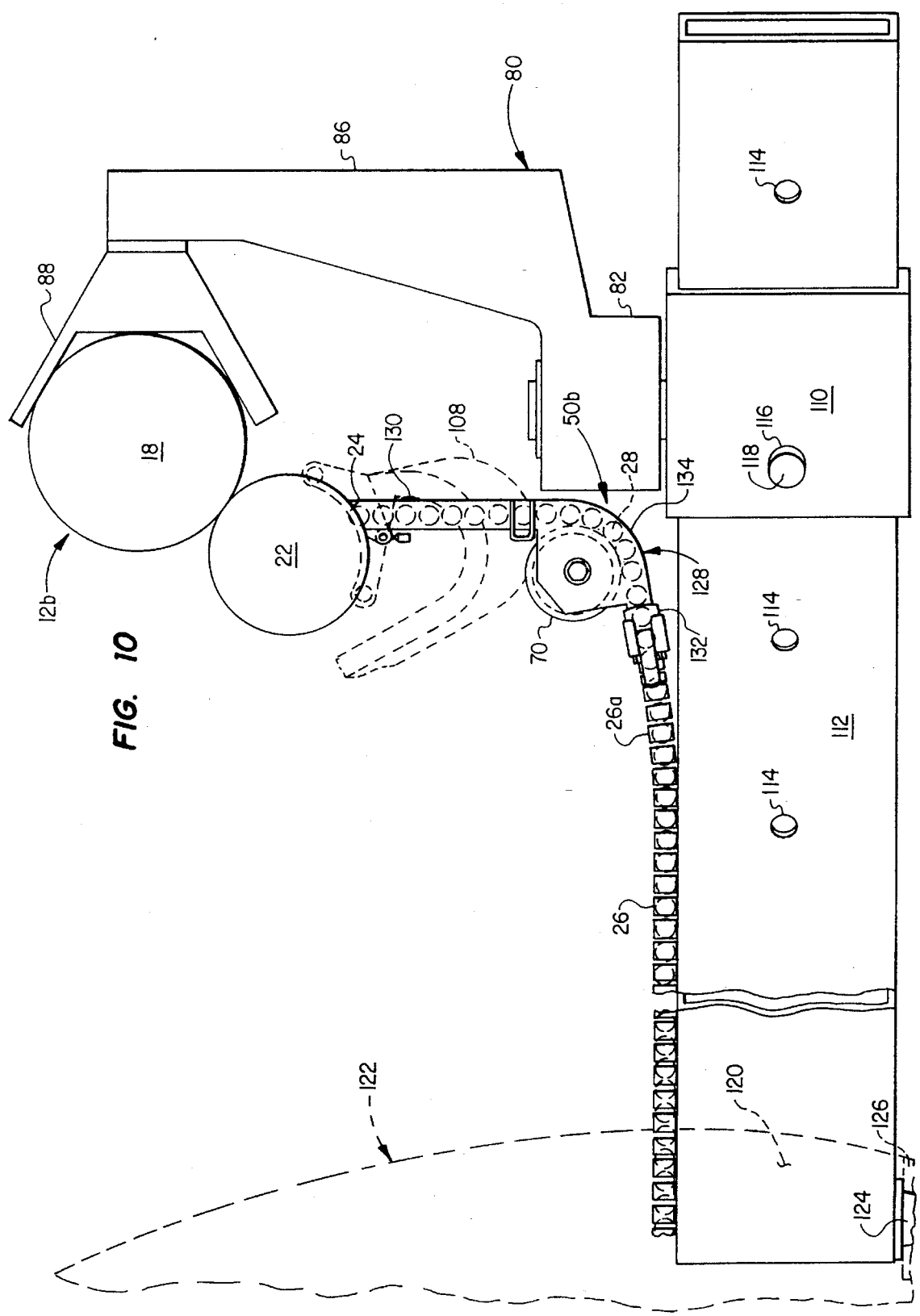
FIG. 10 is somewhat simplified rear end view of a pintle-mounted 7.62 mm machine gun being supplied with belted ammunition using a third embodiment of the feed adapter.

Illustrated in FIG. 10 is a third embodiment 50b of the previously described feed adapter 50 which is representatively utilized in conjunction with a mini machine gun 12b having a body portion 18 and a gun feeder portion 22. Machine gun 12b is operatively supported on a pintle structure 80 having a base portion 82, a vertical portion 86, and a yoke portion 88 positioned at the upper end of portion 86 and operatively receiving the body 18 of the mini machine gun 12b. As illustrated in phantom, the gun feeder 22 has a link ejector chute 108 operatively connected to a lower side thereof.

The pintle base 82 is pivotally secured to a hollow rectangular slider member 110 slidably carried on an elongated, rectangularly cross-sectioned support arm member 112 for movement along its length. The support arm member 112 has a longitudinally spaced series of circular openings 114 formed in a side thereof. To releasably lock the slider member 110 at a selectively variable one of these openings 114 the member 110 is simply moved along the support arm member 112 until a circular opening 116 in the slider member 110 is aligned with one of the support arm openings 114. A locking pin 118 is then inserted into the aligned openings 114,116 to releasably lock the slider member 110, and thus the gun 50b, on the support arm member 112 at a selected longitudinal position thereon.

An inner end portion of the support arm member 112 extends inwardly through a door opening 120 on one side of an aircraft 122 and is pivotally secured, as at 124, to a suitable support structure 126 within the aircraft. The support arm 112 may thus be pivoted in forward and aft directions (i.e., into and out of the sheet) relative to the aircraft. A feed chute 26 is extended from an ammunition box (not shown) within the aircraft 122 outwardly through the door opening 120 to adjacent the mini machine gun 12b, with the ammunition belt 28 being operatively extended through the feed chute 26.

Feed adapter 50b includes a generally L-shaped metal housing 128, through which the ammunition belt 28 is longitudinally extendable, which is operatively interconnectable between the outlet end 26a of the feed chute 26 and the inlet 24 of the gun feeder 22. Housing 128 has an open outlet end 130; an open inlet end 132; and a curved portion 134 positioned between the ends 130 and 132 and having a roller member 70 rotationally mounted therein. The angle between the inlet and outlet leg portions of the housing 128 is representatively about 100°. In a manner previously described in conjunction with the feed adapter 50, the inlet and outlet ends 132,134 of the housing 128 are respectively and releasably secured to the outlet end of the feed chute 26 and the inlet 24 of the gun feeder 22, and the ammunition belt 28 is longitudinally fed through the feed chute 26 and the housing 128 and into the gun feeder 22.

As viewed in FIG. 10, the feed adapter 50b is located behind the link ejector chute 108. Feed adapter 50b, in the mini machine gun application shown in FIG. 10, advantageously serves to position an outlet end of the feed chute 26 in a manner essentially preventing interference between the feed chute as the support arm member 112 is pivoted in forward and aft directions relative to the aircraft 122. Additionally, the feed adapter 50b properly routes the ammunition belt between the pintle base 82 and the link ejector chute 108 in order to essentially prevent interference between the belt and either of these two armament components.

The foregoing detailed description is to be clearly understood as being given by way of illustration and example only, the spirit and scope of the present invention being limited solely by the appended claims.

What is claimed is:

1. A feed adapter for use in facilitating the longitudinal supply of an ammunition belt through a flexible feed chute to an inlet of a gun feeder mechanism on a machine gun along a path having a relatively sharply curved portion adjacent the gun feeder inlet, the feed chute having an outlet end and each round on the ammunition belt having a tapered annular shoulder portion, said feed adapter comprising:

a housing having an open inlet end, an open outlet end, and a first curved portion disposed between said inlet and outlet ends of said housing; and a first roller member, supported within said first curved portion of said housing for rotation relative thereto, said first roller member having a tapered annular shoulder complementarily configured relative to the tapered annular shoulder portions of the ammunition rounds, the ammunition rounds in the ammunition belt being releasably intersecured to one another by a series of interconnected clip members having laterally outwardly projecting portions longitudinally spaced apart from the tapered shoulder portions of the rounds, and said first roller member further having an annular exterior groove formed therein, said annular exterior groove being complementarily configured relative to the laterally outwardly protecting portions of the series of interconnected clip members.

2. The feed adapter of claim 1 wherein: the machine gun is a 7.62 mm mini machine gun, and said housing has a generally V-shaped configuration.

3. The feed adapter of claim 1 wherein: the machine gun is a 7.62 mm mini machine gun, said housing has a generally S-shaped configuration and a second curved portion spaced apart from said first curved portion, and said feed adapter further comprises a second roller member rotationally mounted in said second curved portion and having a configuration substantially identical to that of said first roller member.

4. The feed adapter of claim 1 wherein: the machine gun is a 7.62 mm mini machine gun, and said housing has a generally L-shaped configuration.

* * * * *